(12) United States Patent
Pichaimurthy et al.

(10) Patent No.: US 11,729,244 B2
(45) Date of Patent: Aug. 15, 2023

(54) SYSTEMS AND METHODS FOR MEDIA QUALITY SELECTION OF MEDIA ASSETS BASED ON INTERNET SERVICE PROVIDER DATA USAGE LIMITS

(71) Applicant: Rovi Guides, Inc., San Jose, CA (US)

(72) Inventors: Rajendran Pichaimurthy, Karnataka (IN); Dolphin Masilamany Santha, Karnataka (IN); Prakash Viswanathan, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/504,023

(22) Filed: Oct. 18, 2021

(65) Prior Publication Data

US 2022/0038521 A1     Feb. 3, 2022

Related U.S. Application Data

(63) Continuation of application No. 16/453,847, filed on Jun. 26, 2019, now Pat. No. 11,184,421.

(51) Int. Cl.
*H04L 67/306* (2022.01)
*H04L 67/568* (2022.01)
*H04L 65/80* (2022.01)
*H04L 65/75* (2022.01)

(52) U.S. Cl.
CPC .............. *H04L 65/80* (2013.01); *H04L 65/75* (2022.05); *H04L 67/306* (2013.01); *H04L 67/568* (2022.05)

(58) Field of Classification Search
CPC ....... H04L 65/80; H04L 65/75; H04L 67/306; H04L 67/568
See application file for complete search history.

(56) References Cited

U.S. PATENT DOCUMENTS

| 11,184,421 B2 | 11/2021 | Pichaimurthy et al. |
| 2008/0065718 A1* | 3/2008 | Todd ................... G06F 16/9574 709/219 |
| 2013/0346624 A1* | 12/2013 | Chervets ................. H04W 4/24 709/231 |
| 2015/0350956 A1* | 12/2015 | Bell ..................... H04L 12/1435 455/405 |
| 2016/0191650 A1 | 6/2016 | Rong et al. |
| 2018/0176333 A1 | 6/2018 | Bouvigne |
| 2018/0249017 A1* | 8/2018 | Karam ................... H04W 4/24 |
| 2020/0004889 A1 | 1/2020 | Mathur |

* cited by examiner

*Primary Examiner* — Abdulkader M Alriyashi
(74) *Attorney, Agent, or Firm* — Haley Guiliano LLP

(57) ABSTRACT

Systems and methods are disclosed herein for media quality selection of media assets based on internet service provider data usage limits. One disclosed technique herein discusses receiving a data usage limit from an internet service provider. The data usage limit includes maximum data usage for particular user account data. A media asset is selected from a media streaming server that includes a plurality of qualities having respective data sizes (e.g., for video quality—4K, 1080p, etc.) A determination is made whether a selected data size from a selected quality of the plurality of qualities of the selected media asset exceeds remaining data of the received data usage limit. If so, a request is transmitted to the to the media streaming server to retrieve the selected media asset with a quality having a data size smaller than the respective data size.

18 Claims, 9 Drawing Sheets

401

SYSTEMS AND METHODS FOR MEDIA QUALITY SELECTION OF MEDIA ASSETS BASED ON INTERNET SERVICE PROVIDER DATA USAGE LIMITS

CROSS-REFERENCE TO RELATED APPLICATIONS

This application is a continuation application of U.S. patent application Ser. No. 16/453,847, filed Jun. 26, 2019 (now allowed), the disclosure of which is hereby incorporated by reference herein in its entirety.

BACKGROUND

The present disclosure is directed to techniques for determining media quality selection of media content, more particularly, determining media quality selection based on internet service provider data usage limits.

SUMMARY

Conventional approaches for managing data usage limits associated with user accounts of an internet service provider fail to provide preventative measures to automatically select media assets at appropriate media quality output in order to maximize data usage. These conventional approaches for media quality selection for media assets are generally based on real-time bandwidth calculations to select a media quality commensurate with the available bandwidth strength as long as the data usage limit of the internet service provider is not exceeded. Throttling data speed may be implemented upon the data usage limit being exceeded, forcing the lowest quality media playback (if at all); and even these measures are only taken once, the data usage limit has been exceeded.

Accordingly, techniques are disclosed herein for media quality selection of media assets based on internet service provider data usage limits. One disclosed technique herein discusses receiving a data usage limit from an internet service provider ("ISP"). The data usage limit includes maximum data usage for particular user account data. A media asset is selected from a media streaming server that includes a plurality of qualities having respective data sizes (e.g., for video quality—4K, 1080p, etc.) A determination is made whether a selected data size from a selected quality of the plurality of qualities of the selected media asset exceeds remaining data of the received data usage limit. If so, a request is transmitted to the to the media streaming server to retrieve the selected media asset with a quality having a data size smaller than the respective data size.

Other techniques herein disclose media quality selection for prerecording media assets based on estimated data usage. One of these disclosed techniques herein discusses receiving, for particular user account data, historical periodic data usage from an ISP. An estimated periodic data usage is determined based on historical periodic data usage. A media asset is selected from a media streaming server based on historical media data. The media asset comprises a plurality of qualities having respective data sizes. A determination is made whether a respective data size from a selected quality of the plurality of qualities of the selected media asset exceeds the estimated periodic data usage. If so, a request is transmitted to the media streaming server to prerecord the selected media asset with a quality having the data size smaller than the respective data size.

Numerous techniques are disclosed herein for the determination of estimated periodic data usage to determine media quality selection for the media asset. In one variant, a determination of assets previously retrieved for a previous period of time based on the particular user account media data aids in the determination of periodic data usage. In another variant, metadata is retrieved from the assets previously retrieved for a previous period of time. A determination is made whether metadata of the selected media asset matches a metadata similarity level of previously retrieved metadata. If so, these similar media assets are selected for eventual prerecording.

In some embodiments, the data usage limit is based on a periodic cycle. If the determination found that the selected data size of the plurality of data sizes of the selected media asset does not exceed the remaining data of the received data usage limit, a further determination is made whether a date of the request for the media asset is within an expiry threshold of the periodic cycle (e.g., five days before the monthly period ends). If the date of the request is within the expiry threshold, a request is transmitted to the media streaming server to retrieve the selected media asset with a larger data size than previously selected.

The techniques disclosed herein may be used as efficient means for optimal media quality selection for retrieving/prerecording media assets within a periodic cycle while taking into account a multitude of dynamic variables. For example, an optimal video quality selection may be determined based on a combination of real-time factors including estimated periodic data usage, remaining data usage limit, and expiry threshold of the periodic cycle to achieve the most data efficient use of a periodic data usage limit for a current periodic cycle.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
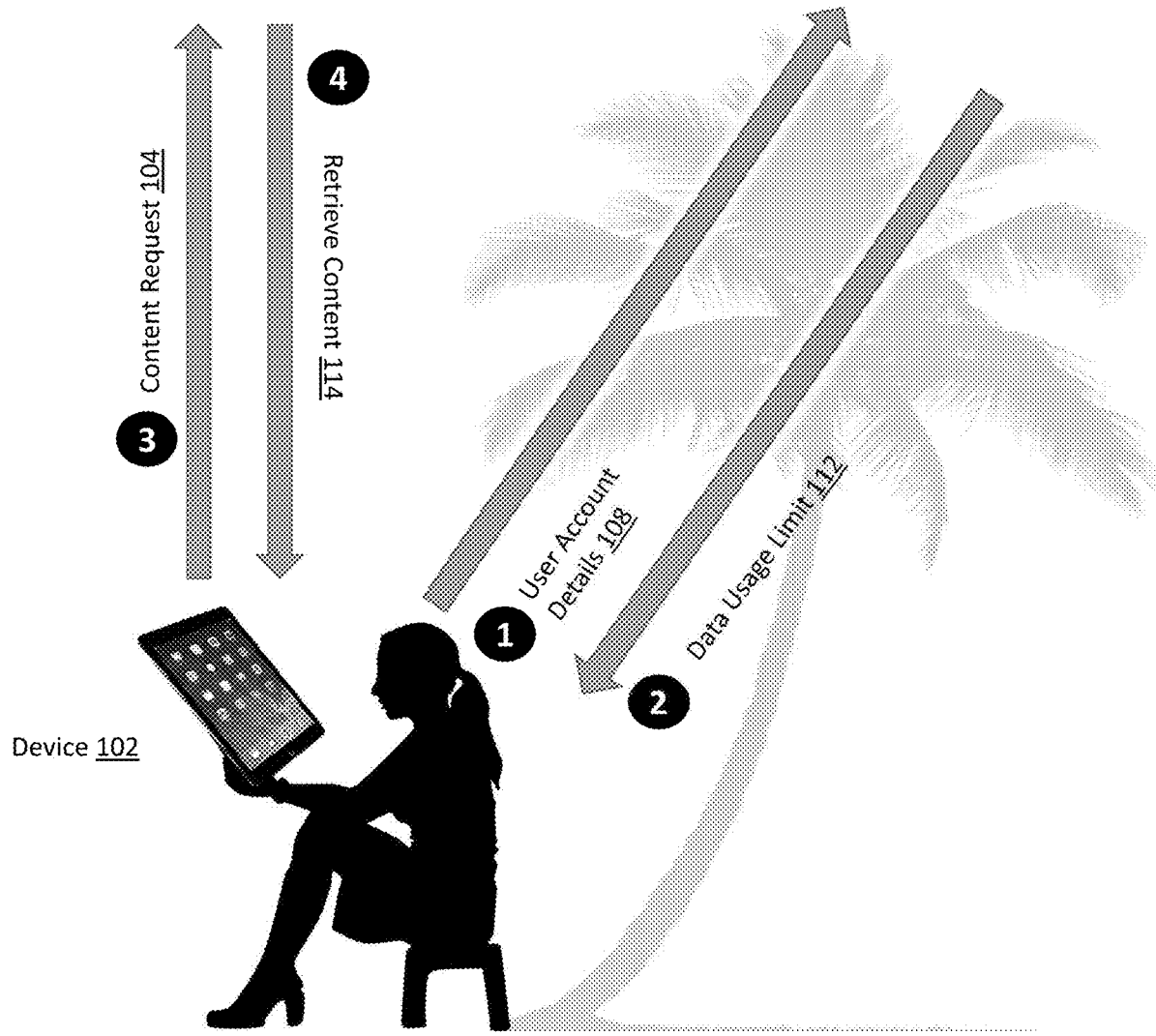
FIG. 1A shows an illustrative diagram for media quality selection of media assets based on internet service provider data usage limits, in accordance with some embodiments of the disclosure.

FIG. 1A shows an illustrative diagram 100 for media quality selection of media assets based on ISP data usage limits, in accordance with some embodiments of the disclosure. A device 102 may transmit a request for user account information 108 to an ISP 110. The user account data may include an identifier to associate the particular user with the ISP. In some embodiments, the user account data may be a shared identifier of the device between the streaming service and the ISP. In some embodiments, the user account data of the streaming service may have stored user account data associated with the particular user's account data with the ISP.

The device 102 may receive a data usage limit 112 from the ISP. The data usage limit includes various ISP information in relation to a user account including maximum data usage, current data usage, data plan constraints, and other related ISP information. In some embodiments, the device receives the data usage limit the first time a request for a media asset is made. After the initial request, the device may store the data usage limit in a data structure and associates the data usage limit with the device. In other variants, the device may receive the data usage limit every time a request for a media asset is made. In yet other variants, the device may receive the data usage limit at a periodic interval. Continuing from the example above, the device receives a data usage limit of monthly limit of 200 GB from the ISP associated with the user. Additionally, the ISP may also indicate the current usage of the user for the periodic monthly cycle (180 GB).

The device 102 may select 104 a media asset from a user interface of a media streaming server 106. The media asset includes a plurality of qualities having respective data sizes. In some variants, the media streaming server receives the request for the movie where the request for the movies includes all available formats, sizes, and/or qualities associated with the movie. For example, if the device requests the movie Iron Man®, available video qualities for Iron Man® include 4K, 1080p, 720p, 480p, 360p, and 240p (each video quality having a corresponding data size for download and/or streaming). Media quality section may be for a variety of media types. For example, video may include the various resolutions stated above, while audio media may include bitrate of the audio quality, and images may be of different formats and/or resolutions. The user interface of a media streaming server may be any user interface or graphical user interface allowing for the user to select a media asset. In some embodiments, the user interface is an application running on a mobile device allowing for direct selection of media assets on the device. The application may also serve as a navigation controller (e.g., remote control) to select a media asset from a second device and/or second screen. In other embodiments, the user interface is a voice command received by the user device. In yet other embodiments, the user interface is a web-based interface for media asset selection.

The device 102 may determine whether a respective data size from a selected quality of the plurality of qualities of the selected media asset exceeds remaining data of the received data usage limit. If the respective data size exceeds the remaining data of the received data usage limit, the device may transmit a request to the media streaming server 106 to retrieve the selected media asset 114 with a quality having a data size smaller than the respective data size. Continuing from the example above, if the Iron Man® movie is selected at 4K, the corresponding data required to download/stream the movie is 30 GB; while if the 1080p video quality is selected, the corresponding data required to download/steam the movie is 8 GB. Because there is 20 GB of remaining data within the 200 GB data usage limit for this month, the device transmits a request to the media streaming server to select the 8 GB 1080p video quality format for Iron Man® as to conserve the remaining data for the month. Without this system in place, conventional systems may stream Iron Man® at 30 GB 4K video quality (only up to 20 GB) until the data usage limit is exceeded at 200 GB. This may result in the remainder of the movie not able to be streamed without additional penalty (e.g., cost to the user), and/or bandwidth throttling.

In other embodiments, similar measures for streaming are implemented where the "data size" is analogous to tiers of average bitrate (ABR) for streaming. The ABR may be implemented using adaptive bitrate streaming techniques including, but not limited to, HTTP techniques such as MPEG-DASH, Adobe® HTTP dynamic streaming, Apple® HTTP live streaming, Microsoft® smooth streaming, QuavStreams adaptive streaming over HTTP, and upLynk implementations.

Figure 1B:
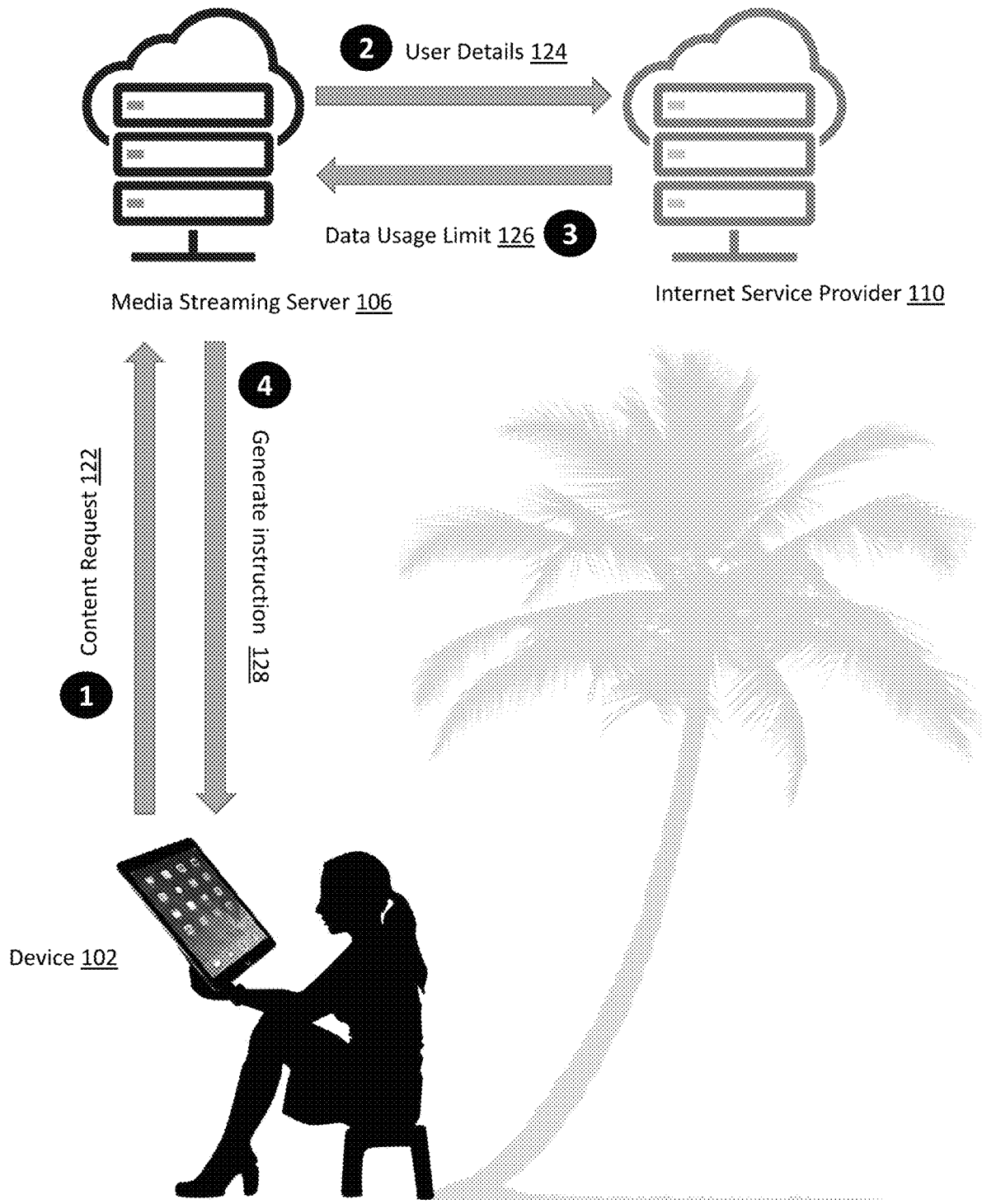
FIG. 1B shows another illustrative diagram for media quality selection of media assets based on internet service provider data usage limits, in accordance with some embodiments of the disclosure.

FIG. 1B shows another illustrative diagram 101 for media quality selection of media assets based on ISP data usage limits, in accordance with some embodiments of the disclosure. The media streaming server 106 may receive a request 122 from a device 102 (e.g., tablet device) for viewing a movie from a streaming service. In some variants, the media streaming server receives the request for the movie where the request for the movie includes all available formats, sizes, and/or qualities associated with the movie. Additionally, the request may include user account data. The user account data may be a username, IP address, MAC address of a device, and/or any metadata that associates a particular user with the media streaming server.

The media streaming server may transmit the user account data 124 to an internet service provider 110. The user account data may include an identifier to associate the particular user with the ISP. In some embodiments, the user account data may be a shared identifier between the streaming service and the ISP. In some embodiments, the user account data of the streaming service may have stored user account data associated with the particular user's account data with the ISP. For example, the media streaming server transmits the email and name of the particular user associated with the user account of the streaming service to the ISP.

The media streaming server may receive a data usage limit 126 from the ISP. In some embodiments, the media streaming server receives the data usage limit the first time a request for a media asset is made. After the initial request, the media streaming server may store the data usage limit in a data structure and associates the data usage limit with the device 102. In other variants, the media streaming server may receive the data usage limit every time a request for a media asset is made. In yet other variants, the media streaming server may receive the data usage limit at a periodic interval. Continuing from the example above, the media streaming server receives a data usage limit of monthly limit of 200 GB from the ISP associated with the user. Additionally, the ISP may also indicate the current usage of the user for the periodic monthly cycle (180 GB).

The media streaming server may determine whether a selected data size of the plurality of data sizes of the media asset exceeds remaining data of the received data usage limit. If the selected data size exceeds the remaining data of the received data usage limit, the media streaming server may generate an instruction 128 for the device to retrieve the media asset with a data size smaller than the selected data size of the plurality of data sizes.

If the respective data size does not exceed the remaining data of the received data usage limit, the media streaming server may generate an instruction for the device to retrieve the selected media asset with the selected quality of the plurality of qualities. Continuing from the example above, if there was 50 GB free of remaining data usage limit, and the Iron Man® movie is selected at 4K, the media streaming server will confirm the selection for 30 GB 4K video quality and play Iron Man® in 4K.

The data usage limit may be based on a periodic cycle. For example, the data usage limit may be based on a monthly, weekly, daily, bi-monthly, annual, or other temporal cycle. In some embodiments, the data usage limit may also be shared amongst one or more users. For example, a "family plan" including one or more devices, may share a 200 GB plan. In this example, the data usage limit applies to a plurality of devices associated with the family plan.

In some variants, if the respective data size does not exceed the remaining data of the received data usage limit, the media streaming server (or device depending on configuration) may determine whether a date of the request for the media asset is within an expiry threshold of the periodic cycle. If the date of the request of the media asset is within the expiry threshold of the periodic cycle, the media streaming server (or device depending on configuration) may transmit a request to the media streaming server to retrieve the selected media asset with a quality having a data size larger than the respective data size. The expiry threshold of the periodic cycle may be predefined by the streaming service. In some embodiments, the expiry threshold of the periodic cycle may be predefined by a user associated with the user account data. The expiry threshold of the periodic cycle may be predefined based on historical information of the user's usage patterns with current and/or past ISPs. Similar to the example above, the device (or media streaming server depending on configuration) determines that there is only two days left in the cycle within the monthly data usage limit and there is 50 GB of remaining monthly data usage limit. If the user selects Iron Man® movie at 8 GB 1080p, the media streaming server will increase the quality video selection to 30 GB 4K video quality and play Iron Man® in 4K given the proximity to the expiry of the monthly data usage limit and the remaining available data (i.e., 50 GB). In some embodiments, a determination is made based on a combination of the expiry threshold of the periodic cycle and the remaining data of the periodic data usage limit.

In some embodiments, the media streaming server may determine whether the respective data size from the selected quality of the plurality of qualities of the selected media asset exceeds remaining data of the received data usage limit by utilizing an estimated periodic data usage. The media streaming server/device may determine an estimated periodic data usage based on historical periodic data usage. In some embodiments, the estimated periodic data usage may take an average of the total data used within the periodic cycles for a number of periodic cycles. For example, an estimated periodic data usage may be based on the prior six months in which the average data usage for the six-month period was 150 GB of a 200 GB monthly data usage limit. In other embodiments, the estimated periodic usage may be based on an aggregate sample of users. In yet other embodiments, the estimated periodic usage may be based on the release dates of one or more media assets for an upcoming periodic period. For example, if a highly anticipated TV series is scheduled to be released in the upcoming month and metadata of the user account indicates that the user may be sufficiently interested in the series, the estimated periodic data usage may increase the estimated period usage to adjust for watching at least a portion of the highly anticipated TV series.

Upon determining the estimated period data usage, the device (or media streaming server depending on configuration) may determine the selected data size of the plurality of data sizes of the selected media asset exceeds the estimated periodic data usage. Continuing from the example above, the device (or media streaming server depending on configuration) may determine, based on an average calculation of the past year that the average data usage on a monthly basis is 160 GB. This 160 GB calculation is used as the estimated periodic cycle. The current data used for the month is 120 GB. If the user selects Iron Man® movie at 30 GB 4K video quality, the media streaming server will confirm the selection for 30 GB 4K video quality and play Iron Man® in 4K as the current data used 120 GB+30 GB 4K Iron Man® media asset is still less than the estimated periodic data usage (160 GB).

In some embodiments, upon a determination that the selected data size of the selected media asset exceeds (or in some variants, does not exceed) the remaining data of the received data usage limit, the device (or media streaming server depending on configuration) may transmit a request to the media streaming server to retrieve the selected media asset with the quality having the data size smaller than the respective data size. The device (or media streaming server depending on configuration) may transmit a request to the media streaming server to retrieve and record the selected media asset with a quality having the data size smaller than the respective data size. Recording the media asset may include storing the media asset of a device, on the media streaming server, or tagging the media asset in a database for ease of access. In other embodiments, the device (or media streaming server depending on configuration) may transmit a request to the media streaming server to retrieve and share the selected media asset with a quality having the data size smaller than the respective data size. Sharing the media asset may include creating a link to the media asset for a social media platform, posting a link of the media asset to a social network account associated with the user account, and/or sending an indicator of the media asset (and/or the media asset itself) with another device via a communication network and/or other means (e.g., Near Field Communication, Bluetooth, etc.). In yet other embodiments, the device (or media streaming server depending on configuration) may transmit a request to the media streaming server to retrieve and playback the selected media asset with a quality having the data size smaller than the respective data size. Playback of the media asset may be on a device selected by one of the device (or media streaming server depending on configuration) or the user.

In another variant of the disclosed technique includes methods for media quality selection for prerecording media assets based on estimated data usage. The device (or media streaming server depending on configuration) may receive, for particular user account data, historical periodic data usage from an ISP. For example, the device may receive user account data showing the monthly data usage for the user associated with the user account data.

The device (or media streaming server depending on configuration) may determine an estimated periodic data usage based on historical periodic data usage. Continuing from the example above, the media streaming server may determine, based on an average calculation of the past year that the average data usage on a monthly basis is 160 GB. This 160 GB calculation is used as the estimated periodic cycle. The current data used for the month is 120 GB. The streaming selects Iron Man® movie for prerecording at 30 GB 4K video quality. The media streaming server will confirm the selection for 30 GB 4K video quality and play Iron Man® in 4K as the current data used 120 GB+30 GB (4K Iron Man®) is still less than the estimated periodic data usage (160 GB).

The device (or media streaming server depending on configuration) may select a media asset from a media streaming server based on historical media data. The media asset includes a plurality of qualities having respective data sizes. The historical media data may be retrieved from the media streaming server storage and/or a third-party storage that stores information related to the user account of the streaming service. In some embodiments, selection may include tagging, or storing metadata associated with the media asset. In some embodiments, the historical media data is based on particular user account media data for a particular user.

The device (or media streaming server depending on configuration) may determine whether a selected data size of the plurality of data sizes of the selected media asset exceeds the estimated periodic data usage. If the selected data size of the selected media asset exceeds the estimated periodic data usage, the device (or media streaming server depending on configuration) may transmit a request to the media streaming server to prerecord the selected media asset with a quality having the data size smaller than the respective data size. Continuing from the example above, if the Iron Man® movie is selected at 4K, the corresponding data required to download/stream the movie is 30 GB; while if the 1080p video quality is selected, the corresponding data required to download/steam the movie is 8 GB. The current data usage is 140 GB of a 200 GB monthly cap. The estimated monthly usage is 150 GB. Because Iron Man® in 4K format exceeds the estimated monthly usage (e.g., 140 GB+30 GB=170 GB that exceeds estimated 150 GB), the device server selects the 8 GB 1080p video quality format for Iron Man® to prerecord as to conserve the remaining data for the month.

In some embodiments, selecting a media asset from a media streaming server includes the device (or media streaming server depending on configuration) determining, based on the particular user account media data, one or more media assets previously retrieved for a previous period of time. For example, a device of the user may provide information to the media streaming server regarding historical information regarding media assets viewed, shared, or recorded for a period of time. In another example, the media streaming server may analyze the media assets viewed, shared, or recorded in the past year where the user watched a large number of movies associated with the horror genre as determined from the metadata of these media assets. The device (or media streaming server depending on configuration) may select the media asset based on a similarity to the one or more media assets previously retrieved for a previous period of time. Similarity may be based on any type of semantic or latent analysis of data derived from the media assets to determine common features of media assets previously retrieved for a previous period of time. For example, the device (or media streaming server depending on configuration) may retrieve metadata from the media assets previously retrieved and then determine whether metadata of the selected media asset matches a metadata similarity level of the retrieved metadata from the media assets previously retrieved. The similarity level may be based on a threshold value. The threshold value may be determined by the media streaming server, and/or other third-party engines for providing analytics. Continuing from the example above, the media streaming server may determine that the metadata associated with a large number of movies retrieved by the user account contained the genre "horror." The media streaming server generates an instruction to prerecord other media assets of the media streaming service that have the metadata genre "horror." Further similarity mechanisms that consider social connections between users, deeper metadata similarity, and third-party popularity rankings may be implemented for the similarity analysis. Once the device (or media streaming server depending on configuration) selects the media asset for recording, the media asset may be stored on the media streaming server and/or device. In other embodiments, a reservation to stream the media asset may be stored on the media streaming server and/or device.

Figure 2A:
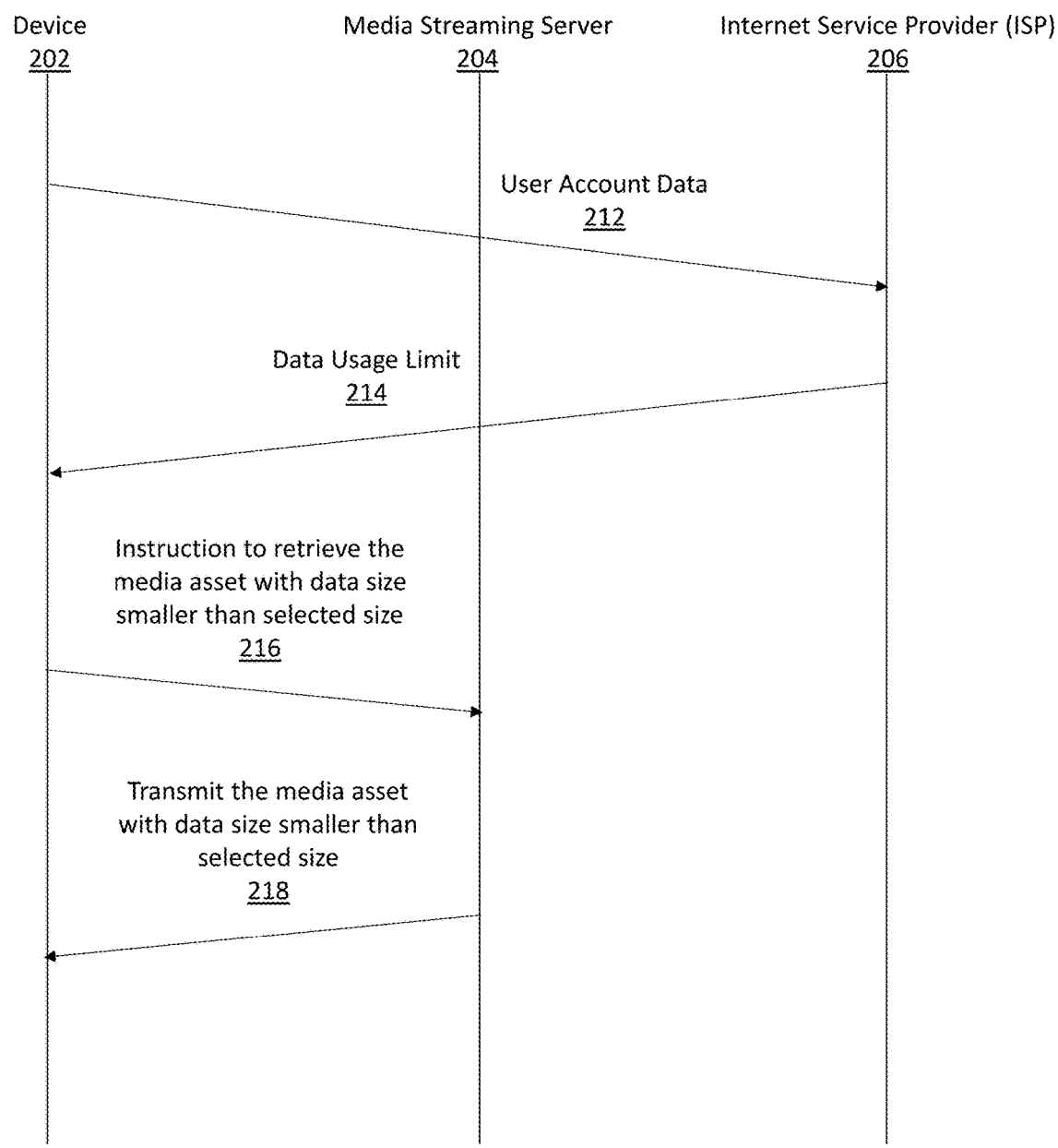
FIG. 2A shows an illustrative data flow diagram including a device, media streaming server, and an internet service provider, in accordance with some embodiments of the disclosure.

FIG. 2A shows an illustrative data flow diagram 200 including a device 202, media streaming server 204, and an internet service provider (ISP) 206, in accordance with some embodiments of the disclosure. The device 202 transmits a request for user account data to an ISP 206. The device 202 receives the data usage limit 214 from the ISP 206. The device 202 transmits a request to the media streaming server 204 to retrieve the selected media asset 216 with a data size smaller than the selected data size of the plurality of data sizes. The device 202 receives confirmation/and or streaming information 218 of the selected media asset from the media streaming server 204.

Figure 2B:
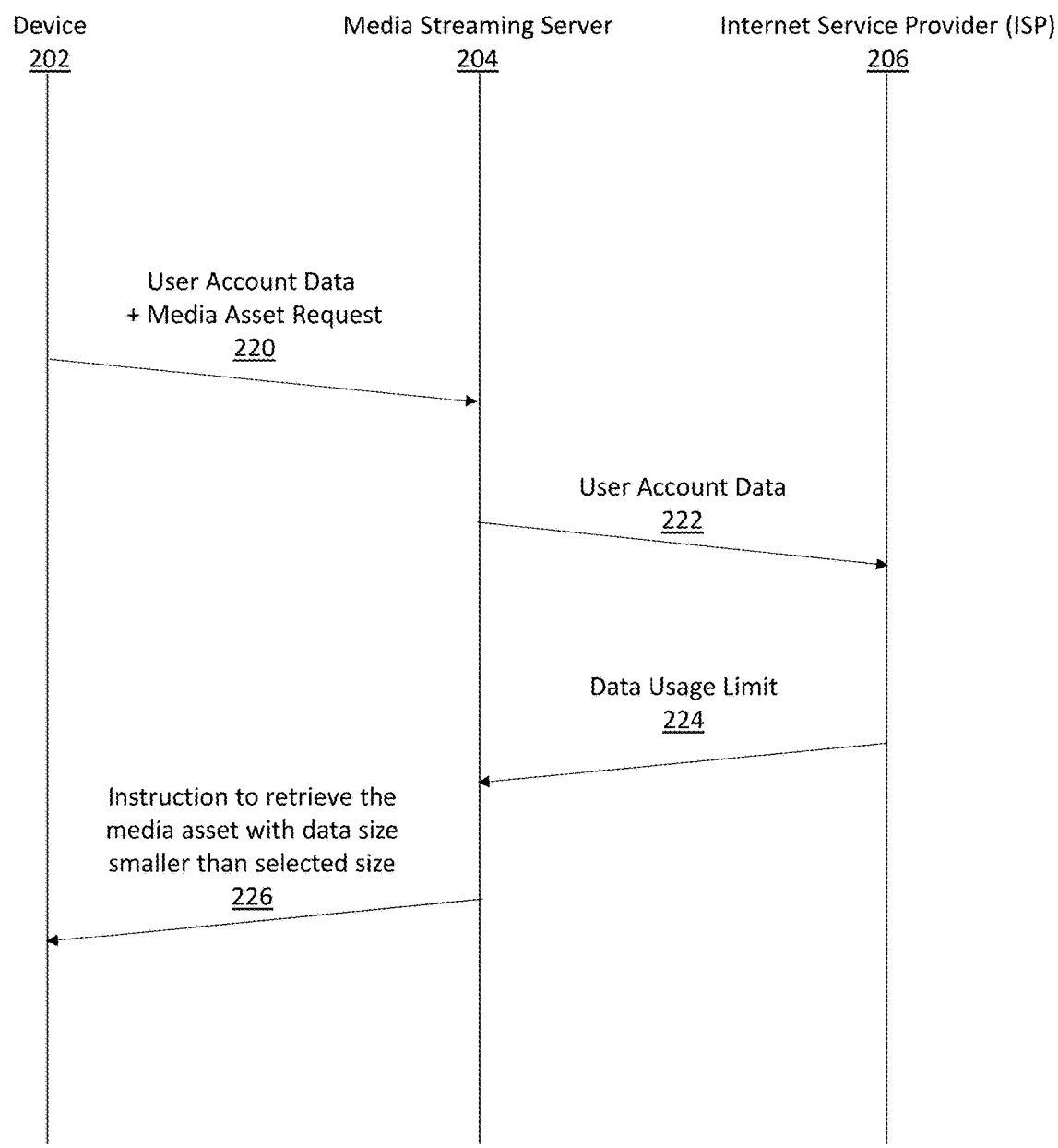
FIG. 2B shows another illustrative data flow diagram including a device, media streaming server, and an internet service provider, in accordance with some embodiments of the disclosure.

FIG. 2B shows another illustrative data flow diagram 201 including a device 202, media streaming server 204, and an internet service provider (ISP) 206, in accordance with some embodiments of the disclosure. The media streaming server 204 receives user account data and media asset request 220 from a device 202. The media streaming server 204 then transmits the user account data 222 to the ISP 206. The media streaming server receives the data usage limit 224 from the ISP 206. The media streaming server 204, upon determining the selected data size of the media asset exceeds the remaining data of the received data usage limit, generates an instruction 226 for the device 202 to retrieve the media asset with a data size smaller than the selected data size.

Figure 3:
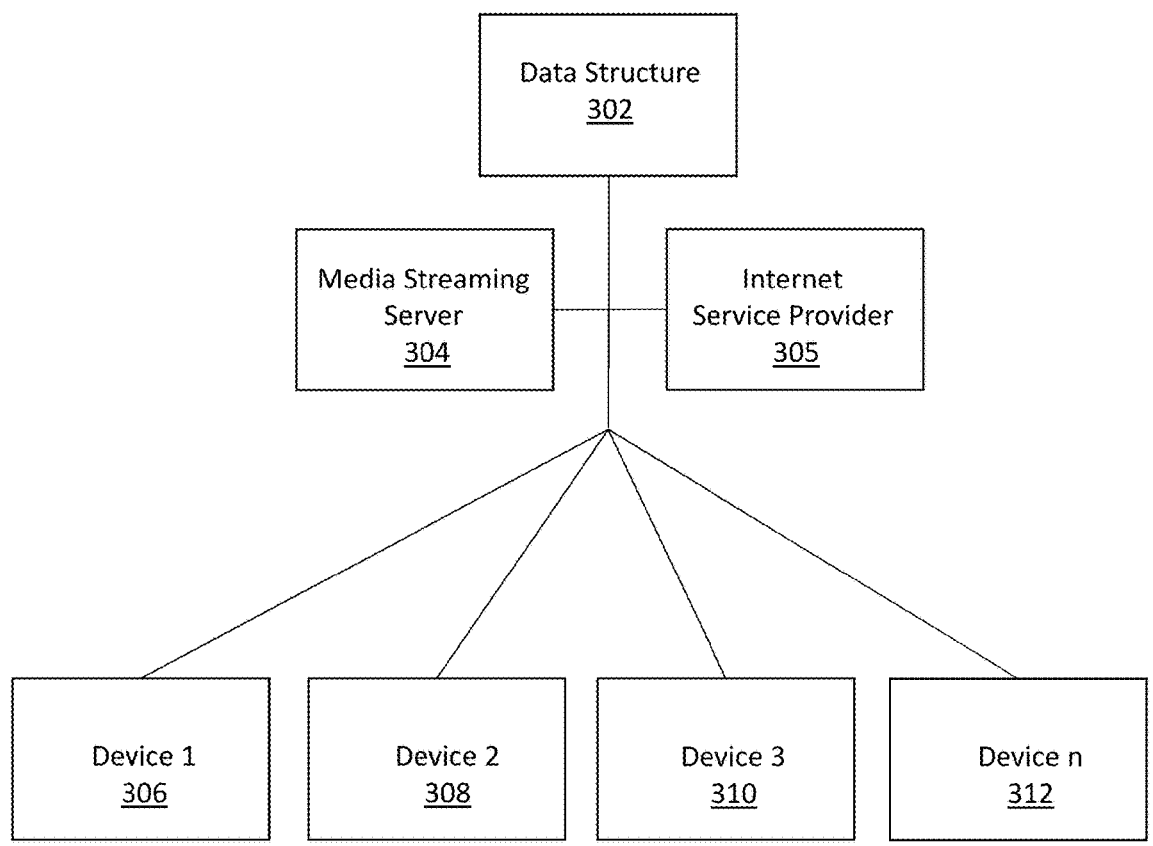
FIG. 3 shows an illustrative system diagram of the media streaming server, data structure, internet service provider, and multiple devices, in accordance with some embodiments of the disclosure.
Figure 4A:
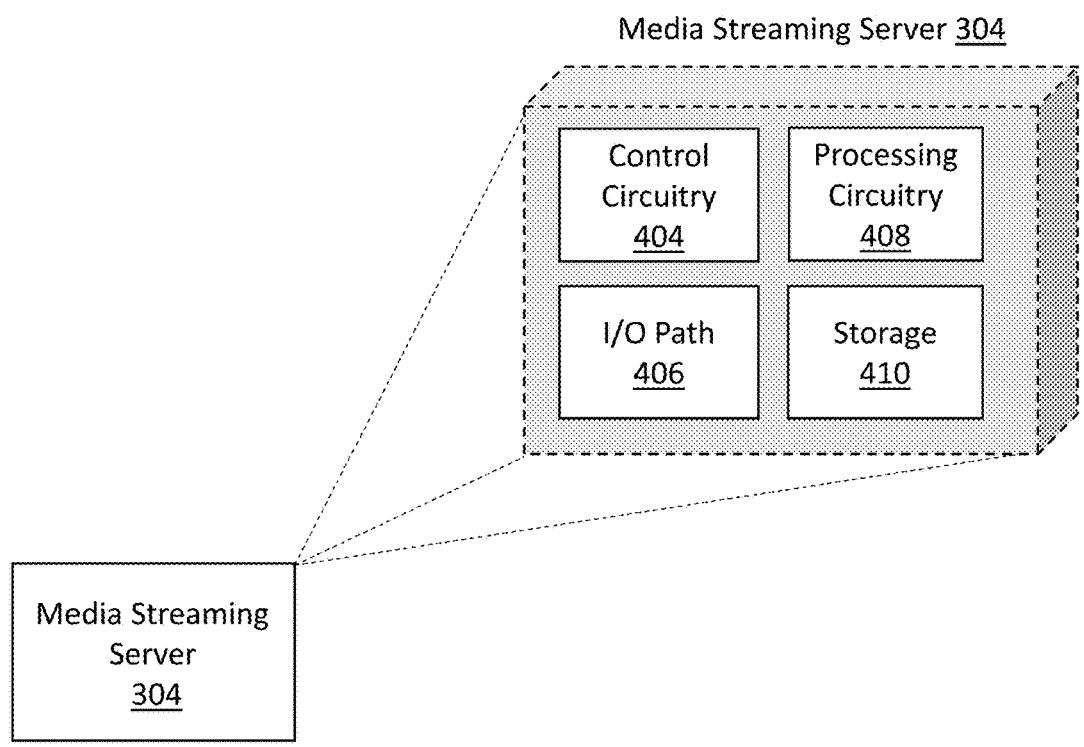
FIG. 4A shows an illustrative block diagram of the media streaming server, in accordance with some embodiments of the disclosure.
Figure 4B:
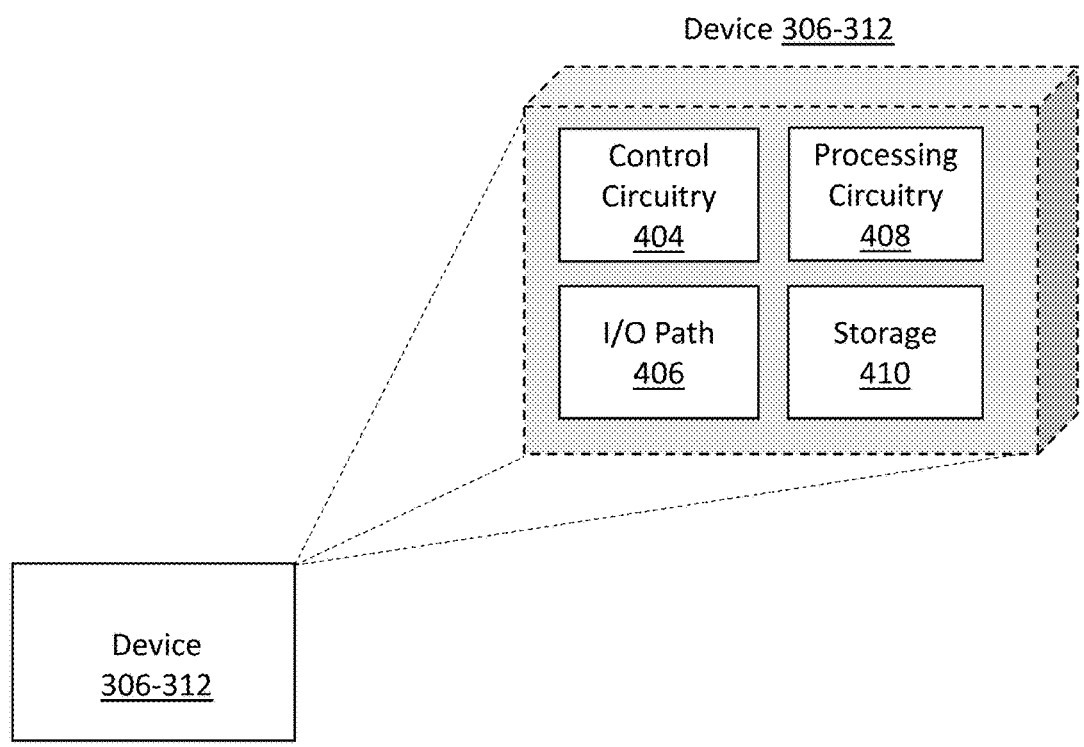
FIG. 4B shows an illustrative block diagram of the device, in accordance with some embodiments of the disclosure.

FIG. 3 shows an illustrative system diagram 300 of the media streaming server, data structure, internet service provider, and multiple devices, in accordance with some embodiments of the disclosure. The media streaming server 304 may be of any hardware that provides for processing and transmit/receive functionality. The media streaming server may be communicatively coupled to multiple electronic devices (e.g., device 1 (306), device 2 (308), device 3 (310), and device n (312)). The media streaming server may be communicatively coupled to a data structure 302. The media streaming server may be communicatively coupled to an ISP 305. Similarly, the devices 306-312 are communicatively coupled to the media streaming server 304, data structure 302, and ISP 305. As illustrated within FIG. 3, a further detailed disclosure on the media streaming server can be seen in FIG. 4A showing an illustrative block diagram of the media streaming server, in accordance with some embodiments of the disclosure. Additionally, as illustrated within FIG. 3, a further detailed disclosure on the devices 306-312 can be seen in FIG. 4B showing an illustrative block diagram of the media streaming server, in accordance with some embodiments of the disclosure.

In some embodiments, the media streaming server may be implemented remote from the electronic devices 306-312 such as a cloud server configuration. The media streaming server may be any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., media streaming server, data structure, ISP, and electronic devices) may be any combination of shared or disparate hardware pieces that are communicatively coupled.

The electronic devices (e.g., device 1 (306), device 2 (308), device 3 (310), and device n (312)) may be any device that has properties to transmit/receive network data as well as a user interface to select media assets (e.g., touch screen, keyboard, voice command input and confirmation, or any other similar user interface). In various systems, devices can include, but are not limited to, network-connected devices (e.g., Internet-of-Things devices), wearable devices, smartphones, tablets, laptops, personal computers, smart appliances, consumer electronics, industrial equipment, security systems, digital twin systems, and similar systems or any combination of these systems.

The data structure 302 may be any database, server, or computing device that contains memory for receiving and transmitting data related to the media streaming server. Example data that may be stored in the data structure includes user account information, metadata of media assets of the streaming service, ISP user account credentials, historical user account information, statistical information related to historical user account information, and/or other network/device/media asset related information. The data structure may be cloud based, integrated into the media streaming server, and/or integrated into one of the devices 306-312. In some embodiments, the data structure is communicatively coupled to both the media streaming server 304 and ISP 305. In other embodiments, a first data structure 302a for the media streaming server 304 is implemented and a second and distinct data structure 302b is implemented for the ISP 305. In this embodiment, data structures 302a and 302b are not directly communicatively coupled, however they have capability to transfer information from data structure 302a from the media streaming server to data structure 302b through the ISP.

The ISP 305 may be a server, or computing device that receives and transmits data to the media streaming server 304, data structure 302 and/or devices 306-312. The ISP may store data usage limit information for respective user accounts associated with the ISP. The ISP may also store credentials and/or identifiers for user accounts associated with the ISP. The ISP may also store information related to user account information related to the data usage for the ISP (e.g., monthly data usage, historical data usage, monthly data usage limit, ISP plan data, and similar data).

FIG. 4A shows an illustrative block diagram 400 of the media streaming server 402, in accordance with some embodiments of the disclosure. In some embodiments, the media streaming server may be communicatively connected to a user interface. In some embodiments, the media streaming server may include processing circuitry, control circuitry, and storage (e.g., RAM, ROM, hard disk, removable disk, etc.). The media streaming server may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an media streaming server stored in memory (e.g., storage 410).

Memory may be an electronic storage device provided as storage 410, that is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The media streaming server 402 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communications networks. The media streaming server may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

FIG. 4B shows an illustrative block diagram 401 of the devices 306-312, in accordance with some embodiments of the disclosure. The devices perform each of the operations described in the following paragraphs individually or collaboratively. In some embodiments, the device/devices may be communicatively connected to a user interface. In some embodiments, the device/devices may include processing circuitry, control circuitry, and storage (e.g., RAM, ROM, hard disk, removable disk, etc.). The device/devices may include an input/output path 406. I/O path 406 may provide device information, or other data, over a local area network (LAN) or wide area network (WAN), and/or other content and data to control circuitry 404, that includes processing circuitry 408 and storage 410. The device/devices 306-312 may be coupled to a communications network.

Figure 5:
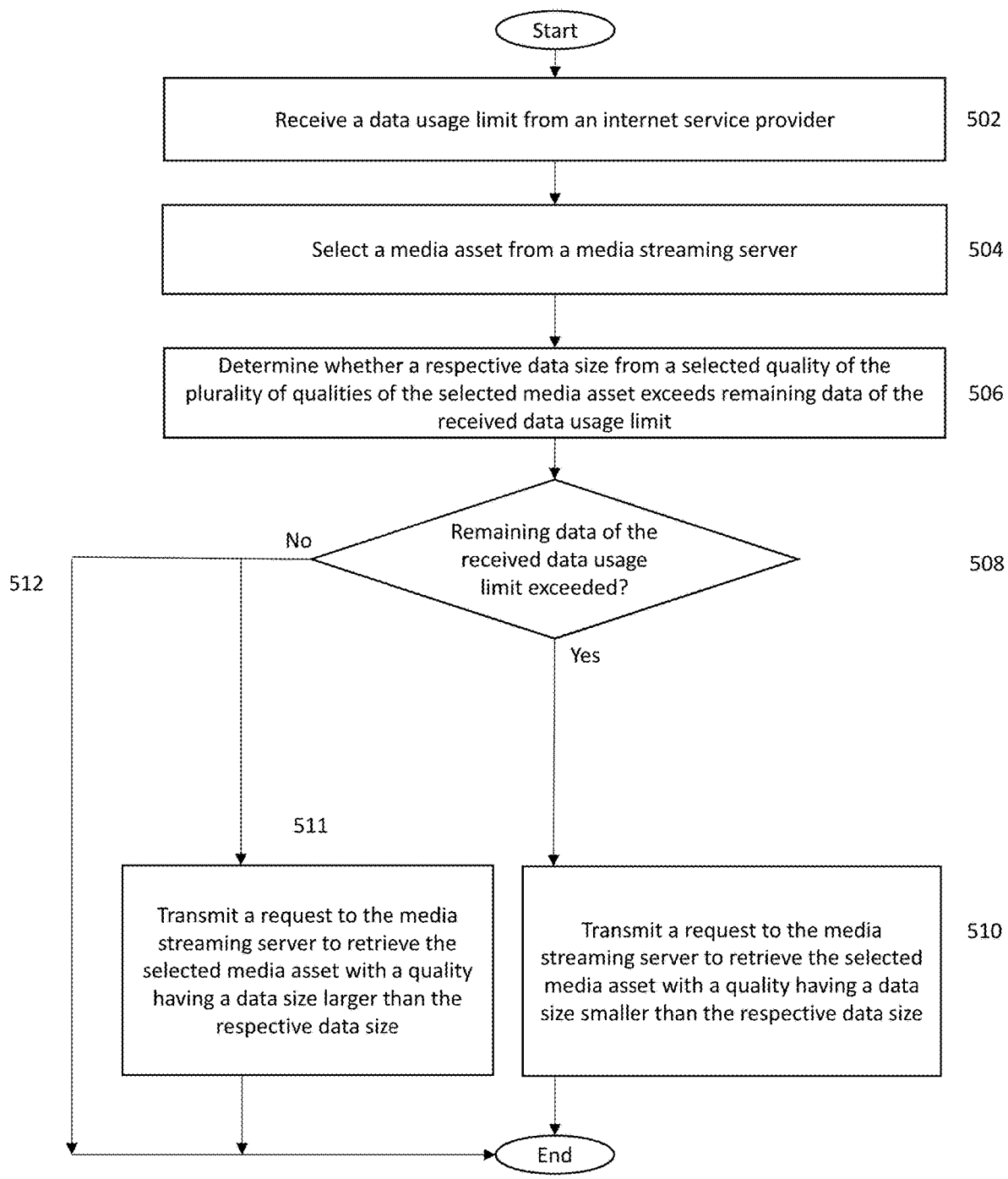
FIG. 5 is an illustrative flowchart of a process for media quality selection of media assets based on internet service provider data usage limits, in accordance with some embodiments of the disclosure.

FIG. 5 is an illustrative flowchart of a process for media quality selection of media assets based on internet service provider data usage limits, in accordance with some embodiments of the disclosure. Process 500, and any of the following processes, may be executed by control circuitry 404 (e.g., in a manner instructed to control circuitry 404 by the media streaming server 402). Control circuitry 404 may be part of network optimizer 402, or of a remote server separated from the network optimizer by way of a communication network, or distributed over a combination of both.

At 502, the media streaming server 304 (or alternatively the device 306-312), by control circuitry 404, receives a data usage limit from an internet service provider 305. The data usage limit includes maximum data usage for particular user account data. In some embodiments, the media streaming server (or alternatively the device 306-312) receives a data usage limit from an internet service provider 305 via the I/O path 406.

At 504, the media streaming server 304 (or alternatively the device 306-312), by control circuitry 404, selects a media asset from a user interface of a media streaming server 304. The media asset includes a plurality of data sizes having respective qualities. In some embodiments, the device 306-312 selects a media asset from a user interface of a media streaming server 304 via the I/O path 406.

At 506, the media streaming server 304 (or alternatively the device 306-312), by control circuitry 404, determines whether a selected data size of the plurality of data sizes of the selected media asset exceeds remaining data of the received data usage limit. In some embodiments, the media streaming server (or alternatively the device 306-312), at least in part, utilizes the processing circuitry 408 to determine whether the selected data size of the plurality of data sizes of the media asset exceeds remaining data of the received data usage limit. If, at 508, control circuitry determines "No," the selected data size of the plurality of data sizes of the selected media asset does not exceed remaining data of the received data usage limit, the process may advance to END following path 512. Alternatively, the process may follow path 511 where the media streaming server 304 (or alternatively the device 306-312), by control circuitry 404, transmits a request to the streaming media server 304 to retrieve the selected media asset with a data size larger than the selected data size of the plurality of data sizes.

If, at 508, control circuitry determines "Yes," the selected data size of the plurality of data sizes of the selected media asset exceeds remaining data of the received data usage limit, the process advances to 510. At 510, the media streaming server 304 (or alternatively the device 306-312), by control circuitry 404, transmits a request to the media streaming server 304 to retrieve the selected media asset with a data size smaller than the selected data size of the plurality of data sizes. In some embodiments, the media streaming server 304 (or alternatively the device 306-312) transmits the request via the I/O path 406. In some embodiments, the media streaming server 304 (or alternatively the device 306-312), at least in part, utilizes the processing circuitry 408 to generate the instruction for the device to retrieve the media asset with a data size smaller than the selected data size of the plurality of data sizes.

Figure 6:
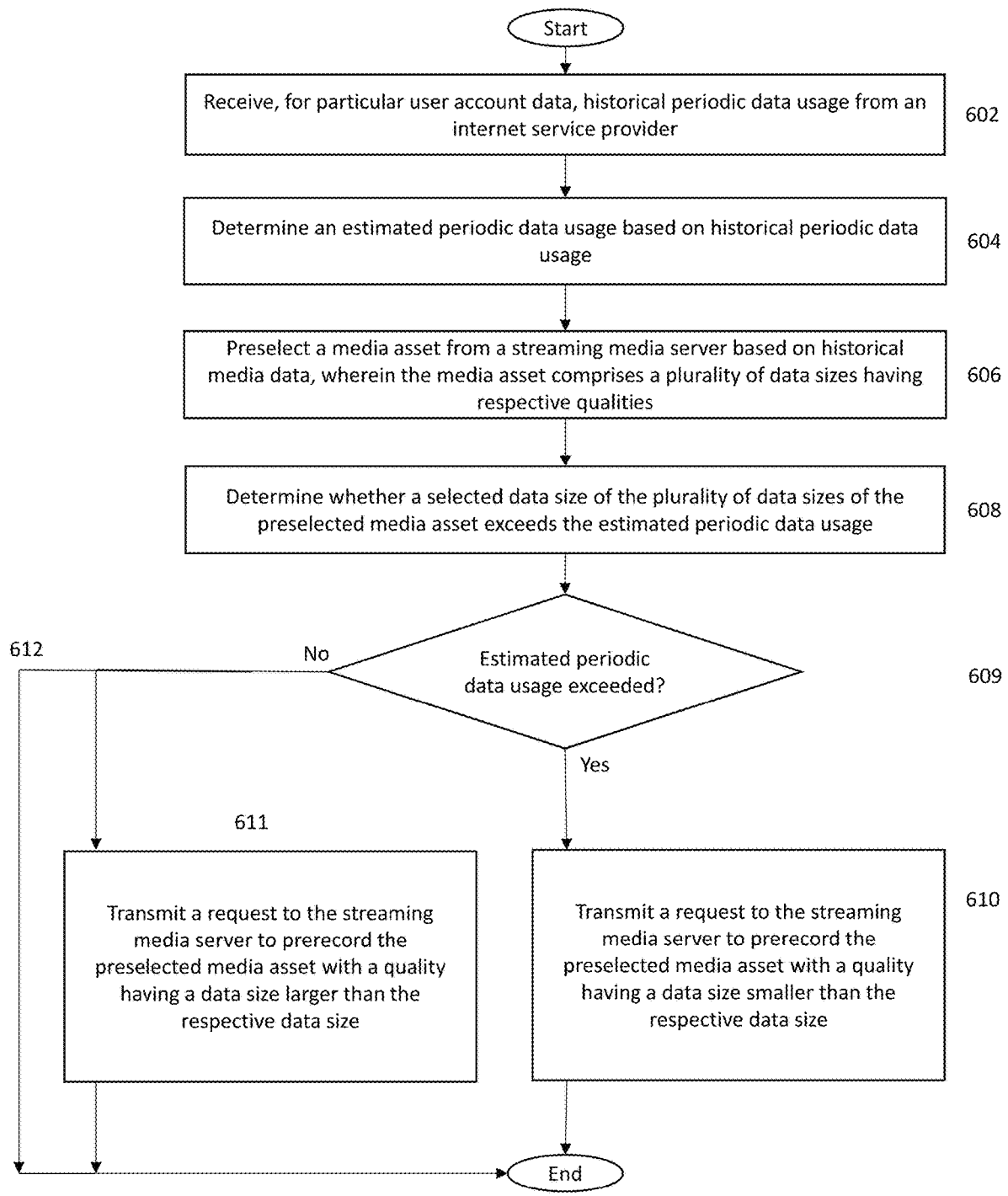
FIG. 6 is an illustrative flowchart of a process for media quality selection for prerecording media assets based on estimated data usage, in accordance with some embodiments of the disclosure.

FIG. 6 is an illustrative flowchart of a process 600 for media quality selection for prerecording media assets based on estimated data usage, in accordance with some embodiments of the disclosure. At 602, the media streaming server 304 (or alternatively the device 306-312), by control circuitry 404, receives, for particular user account data, historical periodic data usage from an internet service provider. In some embodiments, the media streaming server 304 (or alternatively the device 306-312) receives the historical periodic data usage from the ISP via the I/O path 406.

At 604, the media streaming server 304 (or alternatively the device 306-312), by control circuitry 404, determines an estimated periodic data usage based on historical periodic data usage. In some embodiments, the media streaming server (or alternatively the device 306-312), at least in part, utilizes the processing circuitry 408 to determines the estimated periodic data usage.

At 606, the media streaming server 304 (or alternatively the device 306-312), by control circuitry 404, selects a media asset from a media streaming server 304 based on historical media data. The media asset comprises a plurality of data sizes having respective qualities. The media asset comprises a plurality of data sizes having respective video qualities. In some embodiments, the device 306-312 selects the media asset from a media streaming server 304 via the I/O path 406.

At 608, the media streaming server 304 (or alternatively the device 306-312), by control circuitry 404, determines whether a selected data size of the plurality of data sizes of the selected media asset exceeds the estimated periodic data usage. In some embodiments, the media streaming server (or alternatively the device 306-312), at least in part, utilizes the processing circuitry 408 to determine whether a selected data size of the plurality of data sizes of the selected media asset exceeds the estimated periodic data usage. If, at 609, control circuitry determines "No," the selected data size of the plurality of data sizes of the selected media asset does not exceed the estimated periodic data usage, the process advances to END via path 612. Alternatively, the process may take path 611 where the media streaming server 304 (or alternatively the device 306-312), by control circuitry 404, transmits a request to the streaming media server 304 to prerecord the selected media asset with a data size larger than the selected data size of the plurality of data sizes.

If, at 609, control circuitry determines "Yes," the selected data size of the plurality of data sizes of the selected media asset exceeds the estimated periodic data usage, the process advances to 610. At 610, the media streaming server 402 (or alternatively the device 306-312), by control circuitry 404, transmits a request to the media streaming server 304 to prerecord the selected media asset with a data size smaller than the selected data size of the plurality of data sizes. In some embodiments, the device 306-312 transmits a request to the media streaming server 304 via the I/O path 406.

It is contemplated that the steps or descriptions of FIGS. 5-6 may be used with any other embodiment of this disclosure. In addition, the steps and descriptions described in relation to FIGS. 5-6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3, 4A, and 4B could be used to perform one or more of the steps in FIGS. 5-6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for media quality selection of media assets based on internet service provider data usage limits, comprising:
   receiving a data usage limit from an internet service provider, wherein the data usage limit comprises a data usage limit for particular user account data;
   selecting a media asset from a media streaming server, wherein the media asset comprises a plurality of qualities having respective data sizes;
   determining whether a respective data size from a selected quality of the plurality of qualities of the selected media asset exceeds remaining data of the received data usage limit; and
   responsive to the determination that the respective data size from the selected quality of the plurality of qualities of the selected media asset does not exceed remaining data of the received data usage limit, transmitting a request to the media streaming server to prerecord the selected media asset with a quality having a data size larger than the respective data size.

2. The method of claim 1, further comprising:
   responsive to the determination that the respective data size from the selected quality of the plurality of qualities of the selected media asset does exceed remaining data of the received data usage limit, generating an instruction to retrieve the selected media asset with a quality having a data size smaller than the respective data size.

3. The method of claim 1, wherein:
   the data usage limit is based on a periodic cycle;
   responsive to the determination that the respective data size from the selected quality of the plurality of qualities of the selected media asset does not exceed remaining data of the received data usage limit:
      determining whether a date of the selecting of the media asset is within an expiry threshold of the periodic cycle; and
      responsive to the determination that the date of the selecting of the media asset is within the expiry threshold of the periodic cycle, transmitting the request to the media streaming server to prerecord the selected media asset with the quality having the data size larger than the selected quality.

4. The method of claim 1, wherein responsive to the determination that the respective data size from the selected quality of the plurality of qualities of the selected media asset does not exceed remaining data of the received data usage limit further comprises:
   determining an estimated periodic data usage based on historical periodic data usage; and
   determining the selected data size of the plurality of data sizes of the selected media asset does not exceed the estimated periodic data usage.

5. The method of claim 1, wherein the particular user account data comprises historical media data.

6. The method of claim 5, wherein the historical media data is based on particular user account media data, wherein the particular user account media data is related to the particular user account data.

7. The method of claim 1, wherein selecting the media asset from the media streaming server comprises:
   determining, based on the particular user account data, one or more media assets previously retrieved during a previous period of time; and
   selecting the media asset based on a similarity to one or more media assets previously retrieved for the previous period of time.

8. The method of claim 7, wherein selecting the media asset based on the similarity to the one or more media assets previously retrieved for the previous period of time:
   retrieving metadata from the one or more media assets previously retrieved for the previous period of time;
   determining whether metadata of the selected media asset matches a metadata similarity level of the retrieved metadata from the one or more media assets previously retrieved for a previous period of time; and
   responsive to the determination that the selected media asset matches the metadata similarity level of the retrieved metadata from the one or more media assets previously retrieved for a previous period of time, selecting the media asset.

9. The method of claim 8, wherein transmitting the request to the media streaming server further comprises an instruction to prerecord the selected media asset, wherein the instruction comprises at least one of storing the media asset on the media streaming server, or storing a reservation to stream the media asset on the media streaming server.

10. A system for media quality selection of media assets based on internet service provider data usage limits, comprising:
   control circuitry configured to:
      receive a data usage limit from an internet service provider, wherein the data usage limit comprises a data usage limit for particular user account data;
      select a media asset from a media streaming server, wherein the media asset comprises a plurality of qualities having respective data sizes;
      determine whether a respective data size from a selected quality of the plurality of qualities of the selected media asset exceeds remaining data of the received data usage limit; and responsive to the determination that the respective data size from the selected quality of the plurality of qualities of the selected media asset does not exceed remaining data of the received data usage limit, transmit a request to the media streaming server to prerecord the selected media asset with a quality having a data size larger than the respective data size.

11. The system of claim 10, wherein the control circuitry is further configured to:

responsive to the determination that the respective data size from the selected quality of the plurality of qualities of the selected media asset does exceed remaining data of the received data usage limit, generate an instruction to retrieve the selected media asset with a quality having a data size smaller than the respective data size.

12. The system of claim 10, wherein:

the data usage limit is based on a periodic cycle;

the control circuitry is further configured, when responsive to the determination that the respective data size from the selected quality of the plurality of qualities of the selected media asset does not exceed remaining data of the received data usage limit, to:

determine whether a date of the selecting of the media asset is within an expiry threshold of the periodic cycle; and responsive to the determination that the date of the selecting of the media asset is within the expiry threshold of the periodic cycle, transmit the request to the media streaming server to prerecord the selected media asset with the quality having the data size larger than the selected quality.

13. The system of claim 10, wherein the control circuitry is further configured, when responsive to the determination that the respective data size from the selected quality of the plurality of qualities of the selected media asset does not exceed remaining data of the received data usage limit further comprises, to:

determine an estimated periodic data usage based on historical periodic data usage; and determine the selected data size of the plurality of data sizes of the selected media asset does not exceed the estimated periodic data usage.

14. The system of claim 10, wherein the particular user account data comprises historical media data.

15. The system of claim 14, wherein the historical media data is based on particular user account media data, wherein the particular user account media data is related to the particular user account data.

16. The system of claim 10, wherein the control circuitry configured to select the media asset form the media streaming server is further configured to:

determine, based on the particular user account data, one or more media assets previously retrieved during a previous period of time; and select the media asset based on a similarity to one or more media assets previously retrieved for the previous period of time.

17. The system of claim 16, wherein the control circuitry configured to select the media asset based on the similarity to the one or more media assets previously retrieved for the previous period of time is further configured to:

retrieve metadata from the one or more media assets previously retrieved for the previous period of time;

determine whether metadata of the selected media asset matches a metadata similarity level of the retrieved metadata from the one or more media assets previously retrieved for a previous period of time; and responsive to the determination that the selected media asset matches the metadata similarity level of the retrieved metadata from the one or more media assets previously retrieved for a previous period of time, select the media asset.

18. The system of claim 17, wherein the control circuitry configured to transmit the request to the media streaming server is further configured to transmit an instruction to prerecord the selected media asset, wherein the instruction comprises at least one of storing the media asset on the media streaming server, or storing a reservation to stream the media asset on the media streaming server.

\* \* \* \* \*